Figure 1:
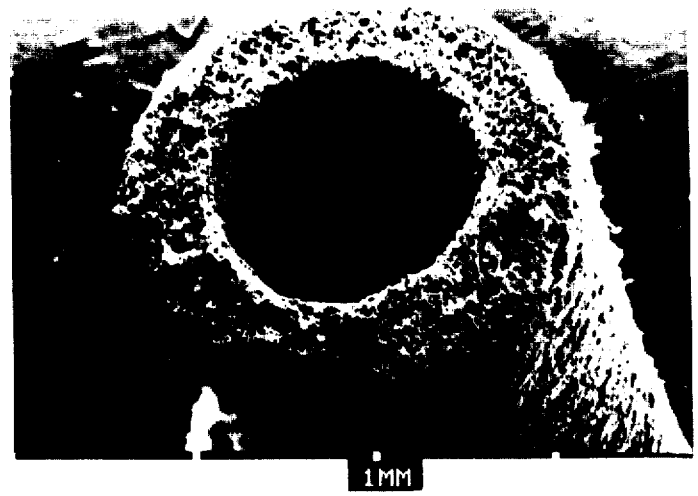
Figure 2:
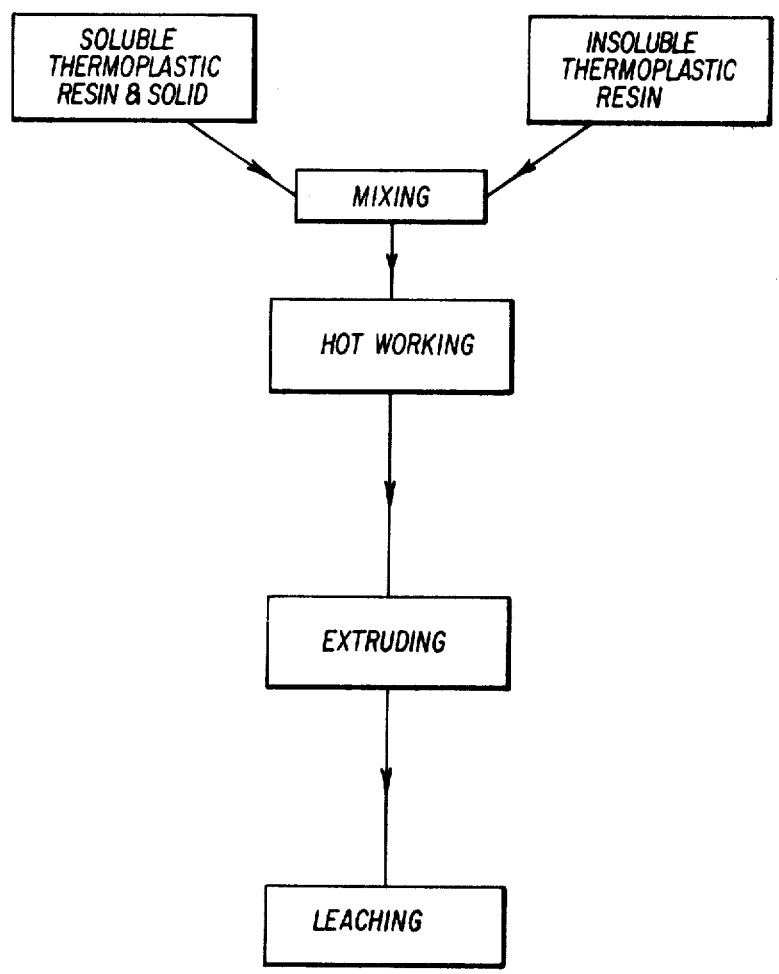

United States Patent [19]

Hankin

[11] 4,414,168
[45] Nov. 8, 1983

[54] PROCESS FOR MANUFACTURING A POROUS DIP TUBE

[75] Inventor: Thomas E. Hankin, Morrisville, Pa.

[73] Assignee: ESB Incorporated, Philadelphia, Pa.

[21] Appl. No.: 209,515

[22] Filed: Nov. 24, 1980

[51] Int. Cl.³ .............................................. B29D 27/00
[52] U.S. Cl. ...................................... 264/49; 222/190;
    222/211; 222/464; 222/564; 264/209.1
[58] Field of Search .............. 222/464, 190, 211, 564,
    222/394, 343; 264/49, 209.1

[56] References Cited

U.S. PATENT DOCUMENTS

| | | | |
|---|---|---|---|
| 3,260,421 | 7/1966 | Rabussier | 222/394 |
| 3,375,208 | 3/1968 | Duddy | 260/2.1 |
| 3,471,064 | 10/1969 | Micallef | 222/190 X |
| 3,536,796 | 10/1970 | Rock | 264/49 |
| 3,985,271 | 10/1976 | Gardner | 222/190 |
| 4,027,789 | 6/1977 | Dickey | 222/564 X |
| 4,159,790 | 7/1979 | Bailey | 222/464 X |
| 4,182,582 | 1/1980 | Youval et al. | 264/49 X |
| 4,279,752 | 7/1981 | Sueoka et al. | 264/49 X |

FOREIGN PATENT DOCUMENTS 971567 9/1964 United Kingdom ................. 264/49

Primary Examiner—Philip E. Anderson

[57] ABSTRACT

A process for making a porous dip tube for use in a pressurized container dispensing liquid material in which a mixture of polymers, one insoluble in the liquid material and a second soluble in a solvent, is extruded to form a tube and thereafter the second polymer is removed from the extruded tube to provide porosity in the wall of the tube. In use, the bulk of liquid material is forced from the bottom of the pressurized container through the tube longitudinally while gaseous matter passes through the wall of the tube to provide means to atomize the liquid material as it passes into the atmosphere.

2 Claims, 2 Drawing Figures

PROCESS FOR MANUFACTURING A POROUS DIP TUBE

The present invention is concerned with the manufacture of an aerosol dip tube and more particularly with a microporous aerosol dip tube.

History of the Art and Problem

In general, it has been practice in aerosol packaging of sprayable materials (excluding foams and pastes) to provide a single phase material (product concentrate plus propellant) which as a liquid is expelled from the nozzle of the aerosol container and which, by virtue of propellant vaporization, formed a fine mist or spray immediately upon leaving the nozzle. Briefly, the aerosol container comprises a containing means or can adapted to withstand the pressure of a liquefied propellant material. At the top of the can, as it is normally employed, is a valve which upon opening by pressing permits passage of material from the can to the exterior. In most instances, the force which causes the material to be propelled from the interior of can through the valve nozzle or orifice is the vapor pressure of a liquefied material known as the propellant. In the past, propellants have commonly been of the fluorinated hydrocarbon type such as sold under the trademark "FREON" by E.I. duPont Nemours Company. In relatively recent times it has been proposed that the use of fluorinated hydrocarbon propellants is deleterious to that portion of the upper atmosphere which provides protection from high energy ultraviolet light. Because of this fear, the use of fluorinated hydrocarbon propellants has diminished. In their place, the art has turned to liquefied hydrocarbons such as, butane, propane, etc. which, as liquids, have high vapor pressures at normal temperatures, i.e., from about 0° C. to about 45° C. One difficulty with use of liquefied hydrocarbons is that, in contrast to fluorinated hydrocarbons, hydrocarbons are flammable. It is, of course, desirous to avoid or minimize if possible the flammability of aerosol dispensed products. Other difficulties are that these hydrocarbons have little or no miscibility with aqueous media and they have poor solvent power for many resinous binders used in aerosol spray compositions.

In general, the aerosol art has tried to provide single phase liquid materials in the aerosol container, which single phase contains both the liquefied propellant and the concentrate of material being dispensed from the aerosol container. When a single phase can be employed, the material being dispensed from the container and the propellant are used up in substantially equal amounts unless the aerosol container valve is accidentally or deliberately opened when the container is in an inverted position. In the usual aerosol container employing a solid dip tube extending from a top-sited valve to the bottom of the can, the propellant and concentrate will not be used up in equal amounts or in the relative amounts present in the can if the propellant phase and the concentrate phase are separated by gravity. If the propellant is heavier than the concentrate phase, depressing the valve mechanism at the top of the can will result in expulsion or pure or relatively pure propellant. On the other hand, if the propellant is lighter than the concentrate phase, which situation normally exists in the case of an aqueous product concentrate and a hydrocarbon propellant, the concentrate will be expelled first and will be exhausted prior to the can being depressurized. This situation can be alleviated somewhat by requiring the user of the aerosol composition, having distinct propellant and concentrate phases, to shake well before using. However, this solution is not very satisfactory because of the normal variations of shaking and the fact that the temporary emulsion which is formed will normally break quickly.

From the point of view of the character of the aerosol spray produced, it is highly advantageous that regardless of whether there is phase separation in the can, the concentrate of effective material and the propellant should be expelled simultaneously. When the concentrate and propellant are expelled simultaneously, the propellant serves not only to force the concentrate from the aerosol container but also to break up the droplets of concentrate as they pass through the valve nozzle and thus produce a fine spray rather than a stream of concentrate or a coarse spray of concentrate. Of course, there are times when a stream of the contained material in an aerosol can is desirable and under those circumstances one does not need simultaneous delivery of propellant and concentrate. On the other hand, for uses such as hair spray, insecticide, deodorizers, oven cleaners and release agents, a fine spray is highly desirable.

The problem of simultaneously expelling propellant and concentrate where the propellant and concentrate are in separate phases and are separated by gravity in an aerosol container has been attacked previously, particularly in the teachings in U.S. Pat. No. 3,260,421 by B. Rabussier. In this patent it is taught to use a dip (or eduction) tube, which is perforated along the whole or part of its length. According to this prior disclosure, the eduction tube passes through layers of liquid in the aerosol container which layers are separated from each other by gravity. The active ingredients in the aerosol container of U.S. Pat. No. 3,260,421 are apparently necessarily contained in the liquefied propellant phase. Upon activating the valve of the prior art aerosol container, the liquefied organic propellant phase containing the active substance is forced into the eduction tube along with an aqueous phase. In the eduction tube the two phases mix and, aided by a separate propellant gas flow into the valve body, the mixed phases are in a satisfactory state for expulsion from the oriface of the valve to provide a finely misted product. U.S. Pat. No. 3,260,421 teaches that the simultaneous expulsion of water and a flammable hydrocarbon propellant phase containing the active ingredient not only affords the means of reducing the cost, but also inhibits flammability of the sprayed aerosol product thus providing a considerable advantage to the user and recovering one advantage of the formerly used fluorinated propellants. When fluroinated propellants could be used, a single phase in an aerosol can could contain flammable organic solvents such as alcohols, ketones, etc. Without danger that the spray would be dangerously flammable because the propellant was a flame depressant. With hydrocarbon propellants, however, the organic solvents necessary to provide single phase stability in aerosol packaged products contribute greatly to the fire damages.

OBJECTS AND DISCOVERY

It is an object of the present invention to provide an improved method of manufacturing an aerosol dispensing means of the type employable when separate phases, eg., aqueous and organic phases, are co-present in an aerosol container.

Another object of the present invention is to provide a method of manufacturing a means whereby active ingredients can be contained in an aqueous phase of an aerosol container containing separate organic and aqueous phases.

A further object of the present invention is to provide a method of manufacturing an aerosol dispensing means whereby the limitations inherent in requiring that an active ingredient be soluble in a liquefied hydrocarbon propellant are avoided.

In furtherance of these objects, it has now been discovered that by means of a microporous eduction tube, limitations inherent in the system of U.S. Pat. No. 3,260,421 can be avoided.

Other objects and advantages of the present invention will become apparent from the following description taken in conjunction with the drawing which is a reproduction of a scanning electron microphotograph of an eduction tube of the present invention.

DESCRIPTION OF THE INVENTION

In general, the present invention comprises a novel method of manufacturing a microporous dip or educt tube adapted to connect with a top-sited valve on an aerosol container and extend from said valve through separate liquid layers of propellant and product concentrate to the bottom of the container. The tube is made of plastic and has an essentially uniform bore and wall thickness. The tube wall is microporous along its length.

For purposes of this specification and claims, the term "microporous" in reference to the novel dip tube, shall mean an essentially continuous porosity in three dimensions, the average size of the pores being of a maximum of about 10 $\mu$m, as measured prior to any swelling of the tube by propellant or product concentrate.

The porosity of the tube wall, conveniently measured by air flow in a given time under a given pressure differential, is governed by the volume percent of microporosity, the average pore size and the wall thickness. For any given combination of product concentrate and propellant phases, the porosity of the tube wall and the tube bore dimension prior to any swelling effects are adjusted generally within the extremes set forth in the following Table to provide satisfactory product spray characteristics.

| Extremes of Tube Characteristics | |
|---|---|
| Bore (mm) | .76 to 1.52 |
| Wall thickness (mm) | .51 to .89 |
| Vol % Porosity in Walls | 30 to 80 |
| Average Pore Size ($\mu$m) | 1 to 10 |

Product spray characteristics may, of course, also be altered by means well known to those of normal skill in the aerosol art other than by altering the microporous dip tube characteristics. For example, propellant gas can be by-passed to a conventional vapor tap valve, special expansion chambers in valve bodies can be employed and special orifices such as a reverse taper orifice can be used. It is contemplated that, as used, the microporous dip tube of the present invention can be used in conjunction with none, any or all of these and other means of modifying product spray characteristics. Some factors which should be considered in adjusting the aforetabulated tube characteristics are relative viscosities of product concentrate and propellant, wetting characteristics of product concentrate and propellant relative to the dip tube material and relative quantities of propellant and concentrate in the aerosol container.

A typical dip tube of the present invention is depicted in the drawing. Referring now thereto, the scanning electromicrophotograph shows the essentially smooth, uniform bore of the tube and the microporosity of the walls. In the tube as illustrated in the drawing, the walls are about 60 volume percent porous, the wall thickness is about 0.64 mm, the bore is 1.27 mm in diameter and the average pore size in the walls is about 8 $\mu$m. Generally, as depicted in the drawing, dip tubes of the present invention are circular in cross section and have a bore of circular cross section. This is merely a matter of convenience. If desired, the dip tubes of the present invention can be of any cross-sectional shape which can be extruded in the size range required.

The dip tube illustrated in the drawing is made of medium density type polyethylene. Generally speaking, it is made in accordance with the teachings of U.S. Pat. No. 3,375,208 to Duddy except as to establishing the product form by extrusion. Fine solid thermoplastic resin, in this case medium density type polyethylene sold under the trademark "MICROTHENE" by U.S.I. Chemical Company is mixed with a second solid thermoplastic resin which is soluble in a leaching solvent, in this case polyethylene oxide type resin sold under the trademark "POLYOX" by Union Carbide Corporation along with a finely ground water soluble solid, in this case −200 mesh sodium chloride and fume silica. The mixed solids are then hot worked to provide a plasticized viscous mass which mass is extruded into tube form by conventional means. The extruded tube, after cooling, is then leached with a leaching solvent, in this case water, to provide the microporous tube structure as depicted in the drawing. Of course resins other than polyethylene can be employed. For example, the basic resin can be polypropylene, polyvinyl chloride, nylon 66 and the like. Water soluble resins other than polyethylene oxide which can be used include polyethylene glycol and polyvinyl pyrrolidone. Those skilled in the art will appreciate that although using a water-soluble resin as a pore former in the manufacture of dip tubes of the present invention is highly advantageous, other resins soluble in solvents which do not dissolve the principal resin can be used in conjunction with such selective solvents. When a non-aqueous solvent is used to selectively leach a resin in the manufacture of the dip tubes of the present invention, a second leach of water soluble solid can be employed or any other appropriate leachant can be used to leach the leachable solid. In addition to the insoluble resin, soluble resin and soluble solid pore former, the blended mass used to manufacture the microporous dip tubes of the present invention can also contain other ingredients which do not destroy the basic character of the tube. For example, the basic insoluble resin can be modified by a plasticizer or plasticizers insoluble both in the leaching solvent and in the ingredients in the aerosol container or by a fugative plasticizer. Furthermore the basic insoluble resin can be compounded with a substance or substances which will modify the surface characteristics thereof to provide for selective wetting or non-wetting by product concentrate and propellant phases.

In operation, under pressure of a liquefied propellant, the eduction (or dip) tube of the present invention carries the lowermost liquid phase present in an aerosol can generally longitudinally along the bore, the liquid of this phase predominately entering the bore at the bottom open end of the tube. The liquid phase or phases above the lowermost phase in the aerosol container enter the dip tube via the porous walls either as fine gas bubbles or as finely dispersed streamlets of liquid. In either event, the phases travelling in the novel dip tube toward the aerosol can valve are in most intimate contact and are suitable for providing good, acceptable aerosol spray characteristics. In particular when a basically aqueous product concentrate is the lowermost layer and a liquefied hydrocarbon propellant such as butane is the upper liquid phase layer, the product expelled from the can is fire resistant and of commercially acceptable spray characteristics.

While the dip tube of the present invention has been described as particularly adapted to be used with aqueous concentrates and hydrocarbons propellants for spray purposes, it is not intended thereby to so limit the applicability of the product claimed herein. The product can be used in any aerosol container having separate liquid phases regardless of the nature or character of those phases.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process for manufacturing a porous dip tube adapted to carry a first liquid longitudinally from an entry open end thereof to a discharge valve at the other end thereof under pressure derived from a second liquid floating on said first liquid and to permit transportation of a component of said second liquid laterally through the wall thereof comprising forming a hot-worked and plasticized viscous mass of a first polymer insoluble in said first and second liquids, a second polymer soluble in a solvent, said solvent being a non-solvent for said first polymer and fine particles of a solid, non-fusible at the hot-working temperature and said solid being soluble in said solvent, extruding said mass to tube form and thereafter dissolving said soluble polymer and said solid in said solvent to thereby provide in the wall of said tube pores having an average cross-sectional dimension of about 1 to about 10 micrometers.

2. A process as in claim 1 wherein the insoluble polymer is polyethylene, the soluble polymer is polyethylene oxide, the soluble solid is a metallic salt and the suitable solvent is water.

* * * * *